United States Patent
Ogasawara

(10) Patent No.: US 8,590,868 B2
(45) Date of Patent: Nov. 26, 2013

(54) LIQUID-SEALED ANTIVIBRATION DEVICE

(75) Inventor: Dai Ogasawara, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 76 days.

(21) Appl. No.: 13/257,744

(22) PCT Filed: Apr. 7, 2010

(86) PCT No.: PCT/JP2010/002548
§ 371 (c)(1),
(2), (4) Date: Oct. 5, 2011

(87) PCT Pub. No.: WO2010/119643
PCT Pub. Date: Oct. 21, 2010

(65) Prior Publication Data
US 2012/0018935 A1    Jan. 26, 2012

(30) Foreign Application Priority Data
Apr. 13, 2009  (JP) ................................. 2009-097282

(51) Int. Cl.
*F16F 5/00*    (2006.01)
(52) U.S. Cl.
USPC .................................................. 267/140.13
(58) Field of Classification Search
USPC ............... 267/140.11, 140.12, 140.13, 140.3, 267/140.4, 141, 141.2
See application file for complete search history.

(56) References Cited

U.S. PATENT DOCUMENTS 4,420,060 A * 12/1983 Kakimoto ..................... 180/300
4,572,490 A * 2/1986 Alciati ..................... 267/140.11
(Continued)

FOREIGN PATENT DOCUMENTS

| | | |
|---|---|---|
| CN | 1715704 A | 1/2006 |
| JP | 61-099745 U | 6/1986 |

(Continued)

OTHER PUBLICATIONS

International Search Report of PCT/JP2010/002548, mailing date May 11, 2010.

(Continued)

*Primary Examiner* — Bradley King
*Assistant Examiner* — Vu Q Nguyen
(74) *Attorney, Agent, or Firm* — Westerman, Hattori, Daniels & Adrian, LLP

(57) ABSTRACT

A partition element 40 which partitions a first liquid chamber 36A and a second liquid chamber 36B is constituted of an annular orifice forming member 44, an elastic wall which blocks a space formed within an inner peripheral wall 44A, and a pair of partition plates 48, 50 which sandwiches the elastic wall. A through hole 74 is formed in an elastic wall portion of the elastic wall 46 which is sandwiched by the partition plates 48, 50. Gaps 78 which are connected with the through hole 74 are formed between wall surfaces of the elastic wall 46 and plate surfaces of the partition plates 48, 50, and a first liquid chamber 36A and a second liquid chamber 36B are connected with each other by way of the through hole 74 and the gaps 78 in a state where a liquid is allowed to flow between these liquid chambers when the partition plates 48, 50 are at a neutral position, and the through hole 74 is blocked by partition plates 48, 50 due to the displacement of the partition plates 48, 50.

4 Claims, 5 Drawing Sheets

(56) References Cited

U.S. PATENT DOCUMENTS

| | | | |
|---|---|---|---|
| 4,997,169 A * | 3/1991 | Nakamura et al. | 267/140.13 |
| 2005/0200060 A1 | 9/2005 | Hiraoka | |
| 2006/0001204 A1 | 1/2006 | Kato et al. | |
| 2006/0267259 A1 | 11/2006 | Hatakeyama et al. | |
| 2009/0224445 A1 | 9/2009 | Hatakeyama et al. | |
| 2011/0193276 A1 | 8/2011 | Ogasawara et al. | |

FOREIGN PATENT DOCUMENTS

| | | | |
|---|---|---|---|
| JP | 63-166738 U | 10/1988 | |
| JP | 2003-074617 A | 3/2003 | |
| JP | 2006-144806 A | 6/2006 | |
| JP | 2006-207672 A | 8/2006 | |
| JP | 2006-258153 A | 9/2006 | |
| JP | 2006-342834 A | 12/2006 | |
| JP | 2007-154904 A | 6/2007 | |
| JP | 2007-162952 A | 6/2007 | |
| JP | 2007-211971 A | 8/2007 | |
| JP | 2007-211972 A | 8/2007 | |
| JP | 2007-218416 A | 8/2007 | |
| JP | 2007-271004 A | 10/2007 | |
| JP | 2008-164102 A | 7/2008 | |
| JP | 2008-196705 A | 8/2008 | |
| JP | 2009-002433 A | 1/2009 | |
| JP | 2009-002434 A | 1/2009 | |

OTHER PUBLICATIONS

Chinese Office Action dated Jan. 28, 2013, issued in corresponding Chinese Patent Application No. 201080016424.7, w/ English translation.

English abstract and machine translation only of JP2009-002433, previously cited in IDS on Sep. 20, 2011; cited in Chinese Office Action dated Jan. 28, 2013.

English translation of the relevant portion of JP61-99745, previously cited in IDS on Sep. 20, 2011; cited in Chinese Office Action dated Jan. 28, 2013.

* cited by examiner

LIQUID-SEALED ANTIVIBRATION DEVICE

TECHNICAL FIELD

The present invention relates to a liquid-sealed antivibration device.

BACKGROUND ART

A liquid-sealed antivibration device includes, in general, a first mounting member, a second mounting member having a cylindrical shape, a vibration-isolating base body which connects the first mounting member and the second mounting member and is made of a rubbery elastic material, a diaphragm which is mounted on the second mounting member so as to form a liquid sealed chamber between the diaphragm and the vibration-isolating base body and is formed of a rubber film, a partition element which partitions the liquid sealed chamber into a first liquid chamber on a vibration-isolating base body side and a second liquid chamber on a diaphragm side, and an orifice flow passage which allows the first liquid chamber and the second liquid chamber to be communicated with each other.

As such a liquid-sealed antivibration device, the following patent document 1 proposes an idea where a partition element by which a first liquid chamber and a second liquid chamber are separated from each other has the following constitution. That is, the partition element includes an annular orifice forming member, an elastic wall made of a rubbery elastic material which blocks a space formed by an inner peripheral surfaces, and a pair of partition plates which is connected to each other via a connecting portion penetrating the elastic wall and sandwiches the elastic wall in the axial direction. Here, the displacement of the pair of partition plates in the axial direction is restricted by the elastic wall.

In such a liquid-sealed antivibration device, the displacement of the pair of partition plates is restricted by the elastic wall. Accordingly, while damping vibrations by making use of a liquid flow effect generated by an orifice flow passage with respect to large amplitude vibrations in a low frequency range, vibrations can be reduced by making use of the reduction of a dynamic spring constant generated by the reciprocating movement of the partition plates with respect to minute amplitude vibrations in a high frequency range.

Patent document 1: JP-A-2009-002433

SUMMARY OF THE INVENTION

Problems to be Solved by the Invention

As described above, with the provision of the constitution disclosed in patent document 1, it is possible to realize lowering of the dynamic spring constant with respect to minute amplitude vibrations in the high frequency range while sufficiently securing damping with respect to large amplitude vibrations in the low frequency range. However, there has been a demand for further lowing of dynamic spring constant at the time of minute amplitude vibrations for improving noise suppression performance. It is difficult for the constitution disclosed in patent document 1 to sufficiently satisfy the above-mentioned request while securing the high damping performance at the time of large amplitude vibrations.

The invention has been made in view of the above-mentioned drawbacks, and it is an object of the invention to provide a liquid-sealed antivibration device which can realize lowering of dynamic spring constant at the time of minute amplitude vibrations thus further improving noise suppression performance while securing high damping performance at the time of large amplitude vibrations.

Means for Solving the Problems

A liquid-sealed antivibration device according to the invention includes: a first mounting member; a second mounting member having a cylindrical shape; a vibration-isolating base body which connects the first mounting member and the second mounting member and is made of a rubbery elastic material; a diaphragm which is mounted on the second mounting member so as to form a liquid sealed chamber between the diaphragm and the vibration-isolating base body and is formed of a rubbery elastic film; a partition element which partitions the liquid sealed chamber into a first liquid chamber on a vibration-isolating base body side and a second liquid chamber on a diaphragm side; and an orifice flow passage which allows the first liquid chamber and the second liquid chamber to be communicated with each other. The partition element includes: an annular orifice forming member which is mounted on an inner side of a peripheral wall portion of the second mounting member and forms the orifice flow passage; an elastic wall which blocks a space formed within an inner peripheral surface of the orifice forming member and is made of a rubbery elastic material; and a pair of partition plates which is connected to each other via a connecting portion which penetrates a radially center portion of the elastic wall, and sandwiches the elastic wall in the axial direction of the elastic wall. The elastic wall includes a through hole which is formed in an elastic wall portion thereof sandwiched between the pair of partition plates in such a manner that the through hole penetrates the elastic wall portion in the axial direction, gaps which are connected with the through hole are respectively formed between wall surfaces of the elastic wall and plate surfaces of the pair of partition plates which face the wall surface in an opposed manner, the first liquid chamber and the second liquid chamber are connected with each other by way of the through hole and the gaps in a state where a liquid is allowed to flow between the first liquid chamber and the second liquid chamber when the pair of partition plates is at a neutral position, and the through hole is configured to be blocked by the partition plates due to the displacement of the pair of partition plates in the axial direction.

Advantages of the Invention

In the liquid-sealed antivibration device according to the invention, with respect to large amplitude vibrations in a low frequency range, the displacement of the pair of partition plates is restricted by the elastic wall, and the through hole formed in the elastic wall is blocked by the partition plates so that a liquid cannot flow whereby high damping performance is secured due to a liquid flow effect generated by the orifice flow passage originally thus providing excellent riding comfort performance. With respect to minute amplitude vibrations in a high frequency range, vibrations can be reduced due to lowering of a dynamic spring constant generated by reciprocating movement of the partition plates. Here, the first liquid chamber and the second liquid chamber are connected to each other in a state where a liquid is allowed to flow between the first liquid chamber and the second liquid chamber through the through hole and the gap and hence, such a portion is made to function as a high frequency orifice whereby the liquid-sealed antivibration device can exhibit a dynamic spring constant lowering effect based on a resonance action of a flowing liquid.

Accordingly, the invention can improve noise suppression performance by realizing the reduction of dynamic spring constant at the time of minute amplitude vibrations while maintaining riding comfort performance by securing high damping performance at the time of large amplitude vibrations.

Figure 1:
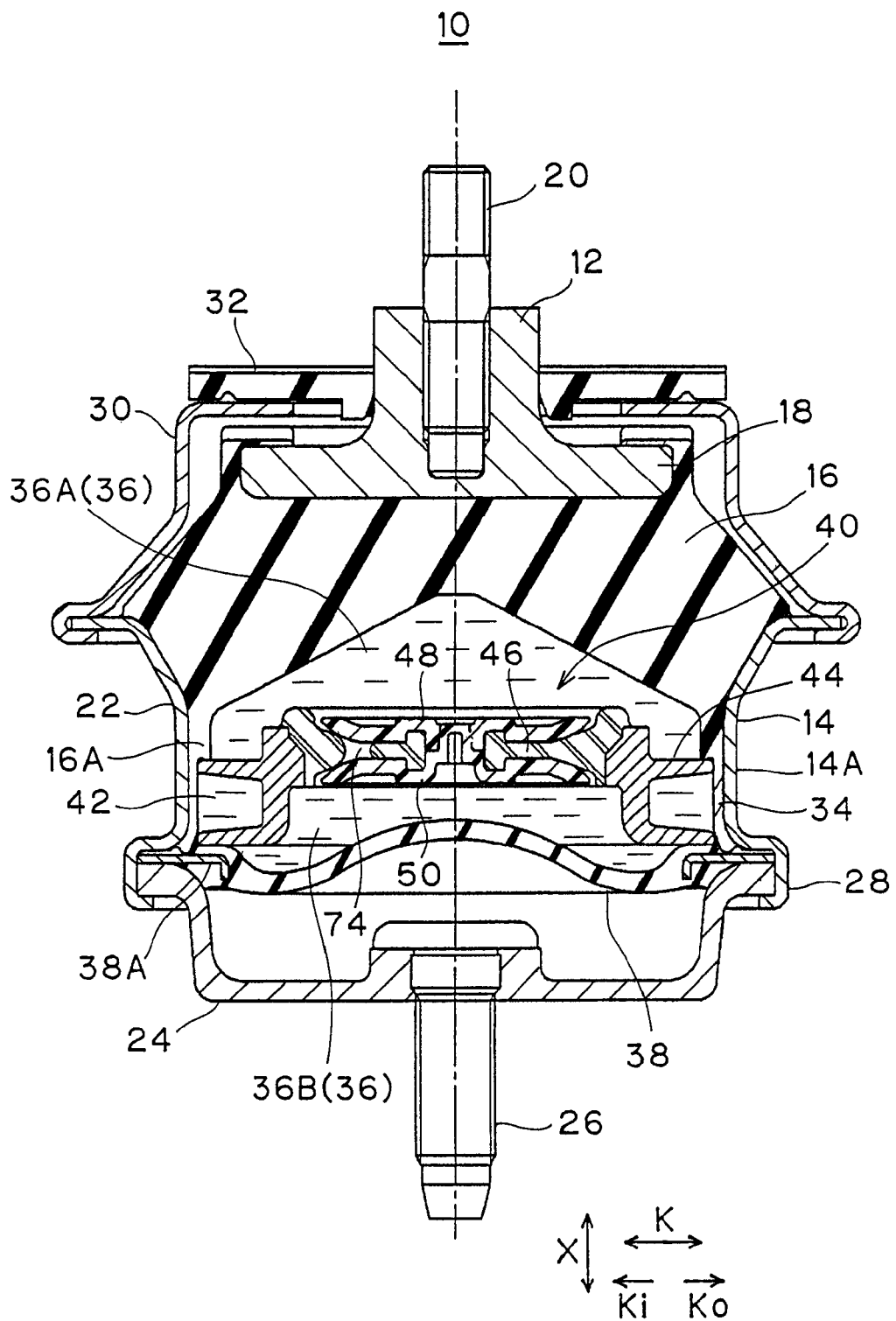
FIG. 1 is a longitudinal cross-sectional view of a liquid-sealed antivibration device according to an embodiment of the invention.

DESCRIPTION OF
REFERENCE NUMERALS AND SIGNS

| | |
|---|---|
| 10: | liquid-sealed antivibration device |
| 12: | first mounting member |
| 14: | second mounting member |
| 14A: | peripheral wall portion |
| 16: | vibration-isolating base body |
| 36: | liquid sealed chamber |
| 36A: | first liquid chamber |
| 36B: | second liquid chamber |
| 38: | diaphragm |
| 40: | partition element |
| 42: | orifice flow passage |
| 44: | orifice forming member |
| 44A: | inner peripheral surface of orifice forming member |
| 46: | elastic wall |
| 48, 50: | partition plate |
| 56: | connecting portion |
| 60: | sandwiching portion |
| 64: | first sandwiching portion |
| 66: | second sandwiching portion |
| 68: | high compression sandwiching portion |
| 74: | through hole |
| 76: | clamped portion |
| 78: | gap |
| C: | circumferential direction |
| K: | radial direction |
| Ko: | radially outer side |
| Ki: | radially inner side |
| X: | axial direction |

MODE FOR CARRYING OUT THE INVENTION

A liquid-sealed antivibration device according to one embodiment of the invention is explained in conjunction with drawings.

FIG. 1 is a longitudinal cross-sectional view of a liquid-sealed antivibration device 10 according to the embodiment. The antivibration device 10 is an engine mount which includes an upper-side first mounting member 12 to be mounted on an engine of an automobile, a lower-side cylindrical second mounting member 14 to be mounted on a vehicle body frame, and a vibration-isolating base body 16 made of a rubber-like elastic material which connects these mounting members to each other.

The first mounting member 12 is a boss fitting arranged at an upper portion of the second mounting member 14 along an axis of the second mounting member 14, and includes a stopper part 18 which projects in the radial direction (that is, the axial perpendicular direction which is the direction perpendicular to the axial direction X) K toward an outer side Ko in a flange shape. Further, a mounting bolt 20 is formed on an upper end portion of the first mounting member 12 in an upwardly projecting manner, and the first mounting member 12 is mounted on an engine side by means of the bolt 20.

The second mounting member 14 is constituted of a circular cylindrical fitting 22 on which the vibration-isolating base body 16 is formed by vulcanization and a cup-shaped bottom fitting 24, wherein a mounting bolt 26 which extends downward is mounted on a center portion of the bottom fitting 24 in a projecting manner, and the second mounting member 14 is configured to be mounted on a vehicle body side by means of the bolt 26. A lower end portion of the cylindrical fitting 22 is caulked and fixed to an upper end opening portion of the bottom fitting 24 by a caulking part 28. Symbol 30 indicates a stopper fitting which is caulked and fixed to an upper end portion of the cylindrical fitting 22, and exhibits a stopper action between the stopper part 18 of the first mounting member 12 and the stopper fitting 30. Symbol 32 indicates a stopper rubber which covers an upper surface of the stopper fitting 30.

The vibration-isolating base body 16 is formed into a frustum-conical shape, wherein an upper end portion of the vibration-isolating base body 16 is adhered to the first mounting member 12 by vulcanization and a lower end portion of the vibration-isolating base body 16 is adhered to an upper end opening portion of the cylindrical fitting 22 by vulcanization. A rubber-film-like seal wall portion 34 which covers an inner peripheral surface of the cylindrical fitting 22 is contiguously formed with the lower end portion of the vibration-isolating base body 16.

A diaphragm 38 which is formed of a flexible rubber film is arranged on the second mounting member 14 such that the diaphragm 38 faces a lower surface of the vibration-isolating base body 16 in an opposed manner in the axial direction X thus defining a liquid-sealed chamber 36 between the diaphragm 38 and the lower surface of the vibration-isolating base body 16. A liquid is sealed in the liquid-sealed chamber 36. By a partition element 40, the liquid sealed chamber 36 is partitioned into a first liquid chamber 36A on a vibration-isolating base body 16 side and a second liquid chamber 36B on a diaphragm 38 side. The first liquid chamber 36A and the second liquid chamber 36B are communicated with each other through an orifice flow passage 42 which constitutes a throttle flow passage. The first liquid chamber 36A is a main liquid chamber where the vibration-isolating base body 16 forms a part of a chamber wall, and the second liquid chamber 36B is a subsidiary liquid chamber where the diaphragm 38 constitutes a part of a chamber wall.

Figure 2:
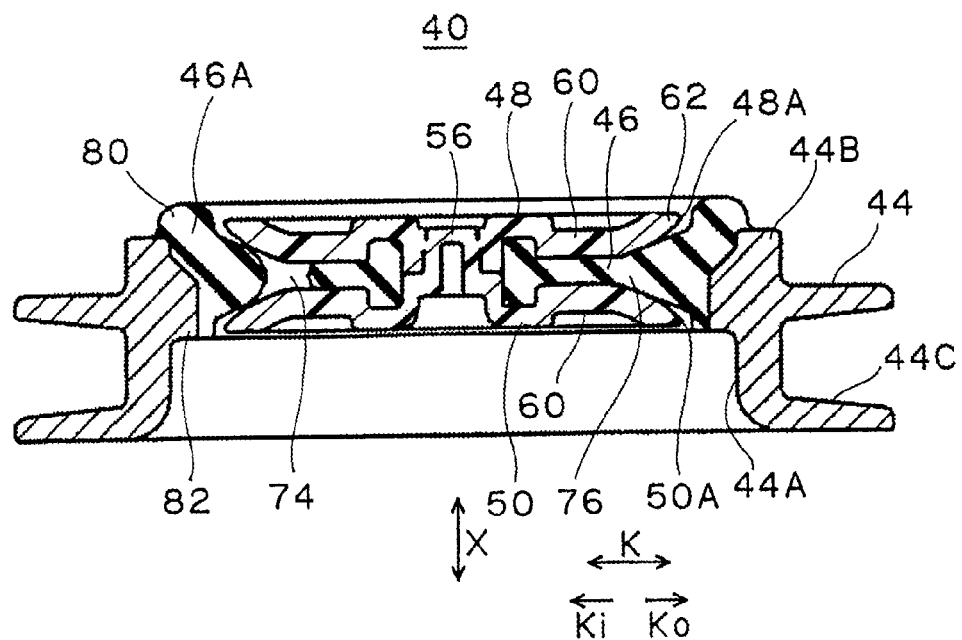
FIG. 2 is a longitudinal cross-sectional view of a partition element of the antivibration device (cross-section taken along a line II-II in FIG. 7).

The partition element 40 is, as shown in FIG. 1 and FIG. 2, constituted of a circular annular orifice forming member 44 which is mounted on an inner side of a cylindrical peripheral wall portion 14A of the second mounting member 14, an elastic wall 46 formed of a rubber elastic body which has an outer peripheral portion 46A thereof adhered to an inner peripheral surface 44A of the orifice forming member 44 by vulcanization thus blocking a space formed within the inner peripheral surface 44A, and a pair of upper and lower partition plates 48, 50 which sandwiches the elastic wall 46 in the axial direction X.

The orifice forming member 44 is a member made of a rigid material and an orifice flow passage 42 extending in the circumferential direction is formed between the orifice forming member 44 and the peripheral wall portion 14A of the second mounting member 14. The orifice forming member 44 is fitted in a seal wall portion 34 which forms an inner periphery of the peripheral wall portion 14A. To be more specific, the orifice forming member 44 includes a cylindrical part 44B which is arranged coaxially with the peripheral wall portion 14A of the second mounting member 14, and a recessed groove portion 44C which has a U-shaped cross-section and opens outward on an outer peripheral side of the cylindrical part 44B. An inner peripheral surface of the cylindrical part 44B forms the above-mentioned inner peripheral surface 44A. Further, the above-mentioned orifice flow passage 42 is formed between the recessed groove portion 44C and the peripheral wall portion 14A of the second mounting member 14.

The orifice forming member 44 is sandwiched and fixed by a reinforcing fitting 38A which is embedded in an outer peripheral portion of the diaphragm 38 and a stopper stepped portion 16A which is formed on an outer peripheral portion of a lower end of the vibration-isolating base body 16. To be more specific, the reinforcing fitting 38A mounted on the outer peripheral portion of the diaphragm 38 is caulked and fixed by the caulking portion 28 of the second mounting member 14, and a lower end portion of the orifice forming member 44 is supported by the reinforcing fitting 38A via a rubber portion of the diaphragm 38 which covers an inner peripheral portion of the reinforcing fitting 38A.

Figure 3:
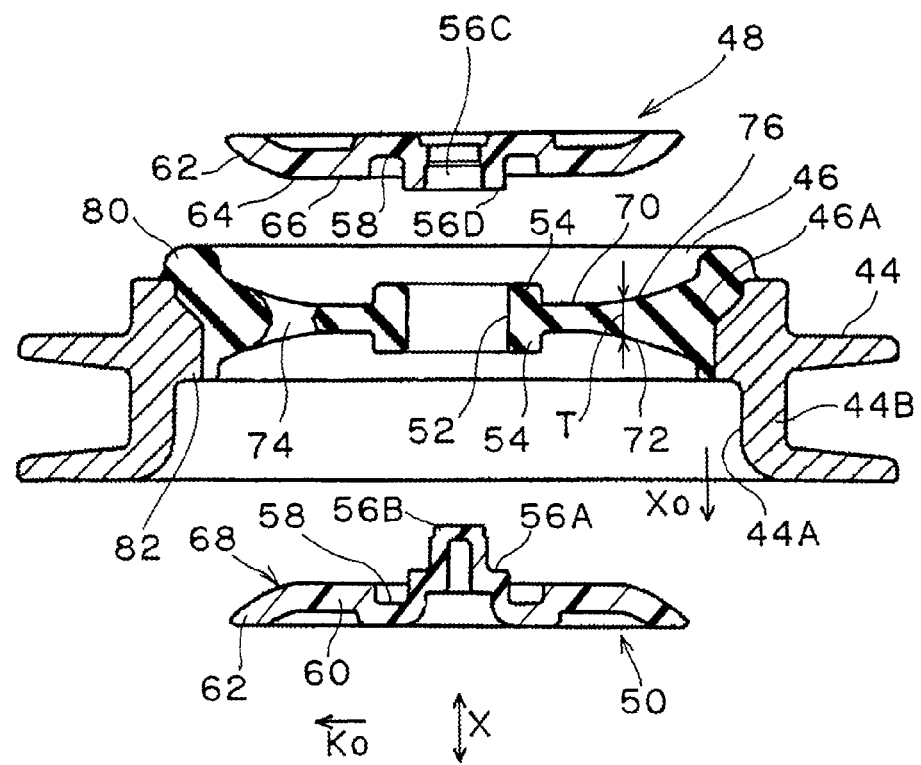
FIG. 3 is an exploded longitudinal cross-sectional view of the partition element.

The above-mentioned elastic wall 46 has a circular shape as viewed in a plan view and, as shown in FIG. 3, the outer peripheral portion 46A of the elastic wall 46 is adhered to the inner peripheral surface 44A of the cylindrical part 44B of the orifice forming member 44 by vulcanization. The elastic wall 46 includes a circular connection hole 52 which penetrates a radially central portion of the elastic wall 46 in the axial direction X, and an annular projecting ridge 54 which projects in the axial direction X is formed on both front and back sides of the elastic wall 46 around the connection hole 52.

Figure 4:
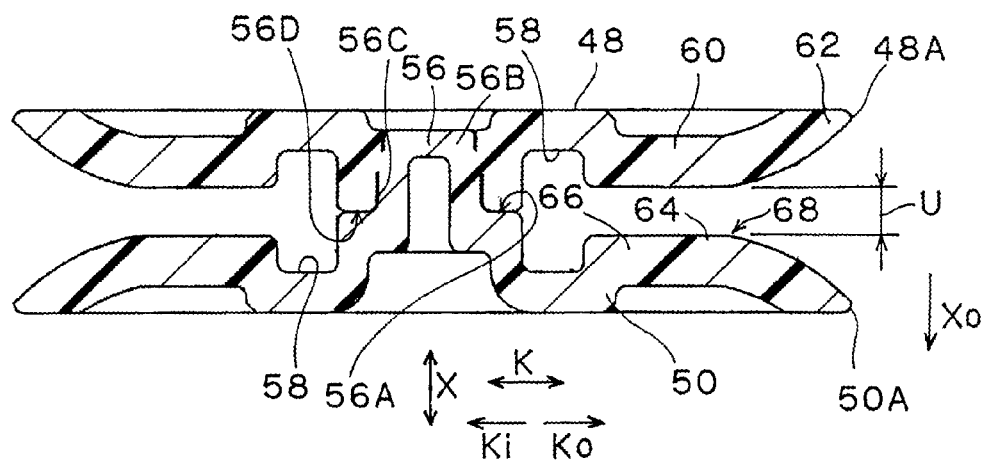
FIG. 4 is a longitudinal cross-sectional view of a pair of partition plates which constitutes the partition element in a connected state.

The pair of partition plates 48, 50 is connected to each other by way of a columnar connecting portion 56 which passes through the connection hole 52 as shown in FIG. 2 and FIG. 4 and are integrally formed using a thermoplastic resin. Out of the pair of partition plates 48, 50, one (upper-side) partition plate 48 constitutes a part of the chamber wall of the first liquid chamber 36A. That is, the partition plate 48 is arranged to face the first liquid chamber 36A in an opposed manner (see FIG. 1). On the other hand, the other (lower-side) partition plate 50 constitutes a part of the chamber wall of the second liquid chamber 36B. That is, the partition plate 50 is arranged to face the second liquid chamber 36B in an opposed manner. The displacement of the pair of partition plates 48, 50 in the axial direction X is restricted by the elastic wall 46.

The pair of partition plates 48, 50 is formed with a profile smaller than a profile of the elastic wall 46 as viewed in a plan view. That is, outer peripheries 48A, 50A of the partition plates 48, 50 terminate on a more radially inner Ki side than the inner peripheral surface 44A of the orifice forming member 44 where an outer periphery of the elastic wall 46 is positioned (see FIG. 2).

As shown in FIG. 3, the connecting portion 56 includes a ring-shaped first planar portion 56A which is formed on the lower-side partition plate 50 and is perpendicular to the axial direction X, a fitting projecting portion 56B which projects from the first planar portion 56A in the axial direction X, a fitting recessed portion 56C which is formed on the upper-side partition plate 48 and in which the fitting protecting portion 56B is fitted, and a ring-shaped second planar portion 56D which is formed on an opening peripheral portion of the fitting recessed portion 56C and is perpendicular to the axial direction X. As shown in FIG. 4, the fitting projecting portion 56B and the fitting recessed portion 56C are fitted and fixed to each other by ultrasonic welding in a state where first planar portion 56A and the second planar portion 56D are positioned in the axial direction X by being contact with each other.

Figure 8:
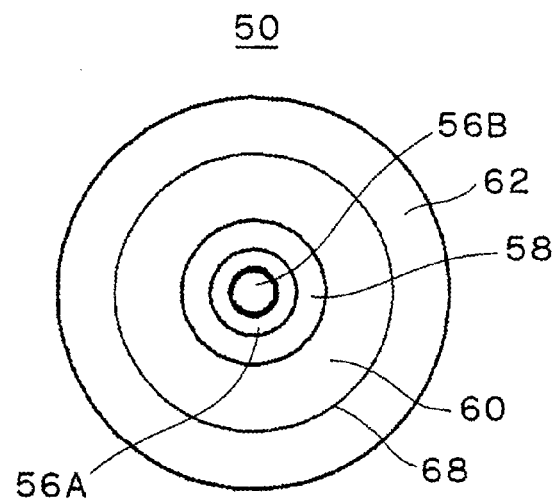
FIG. 8 is a plan view of the partition plate which constitutes the partition element.

Annular grooves 58 in which the upper and lower projection ridges 54 of the elastic wall 46 are fitted respectively are formed on the pair of partition plates 48, 50 around the connecting portion 56 arranged at the center portion of the partition plates 48, 50 (see FIG. 3, FIG. 8). On outer peripheries of the annular grooves 58, that is, on a radially outer Ko side of the annular grooves 58, sandwiching portions 60 which sandwich the elastic wall 46 in the axial direction X are formed annularly over the whole circumference. Further, on outer peripheries of the sandwiching portions 60, that is, on a radially outer Ko side of the sandwiching portions 60, a clearance forming portion 62 which forms a clearance 61 with a wall surface of the elastic wall 46 opposed to the clearance forming portion 62 is formed (see FIG. 6). The clearance 61 is gradually widened toward the radially outer Ko side. The clearance forming portions 62 constitute outer peripheral edge portions of the partition plates 48, 50 respectively.

Figure 6:
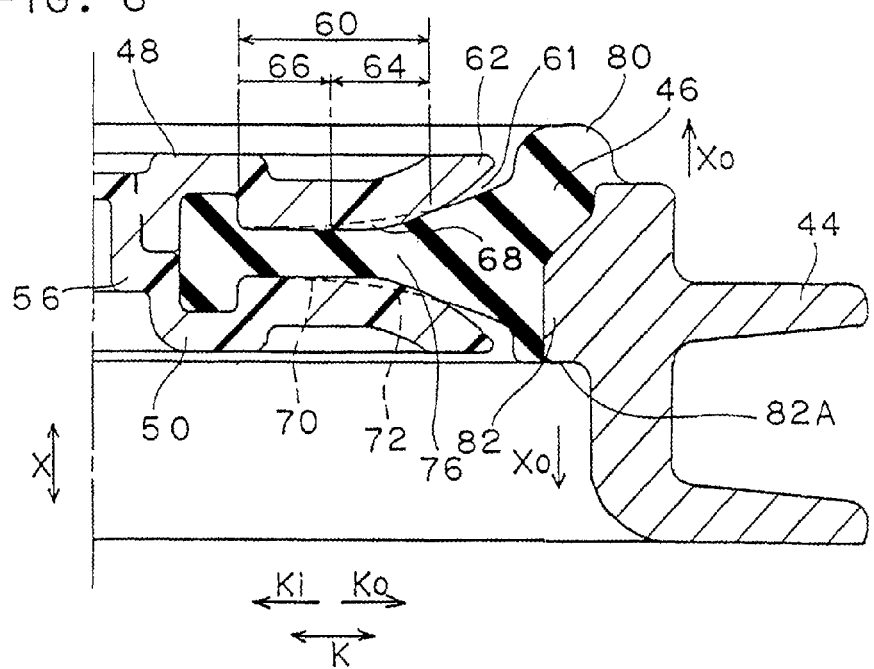
FIG. 6 is a longitudinal cross-sectional view of an essential part showing the structure of the partition element around a clamped portion in an enlarged manner.

As shown in FIG. 6, with respect to the above-mentioned sandwiching portion 60, by setting a radially intermediate position as a boundary, assume a radially outer Ko side arranged outside the boundary, that is, an outer peripheral side as a first sandwiching portion 64, and assume a radially inner Ki side arranged inside the boundary, that is, an inner peripheral side as a second sandwiching portion 66. Here, a high compression sandwiching portion 68 which sandwiches the elastic wall 46 with a higher compression rate in the axial direction X than the second sandwiching portion 66 is formed in the first sandwiching portion 64. That is, the sandwiching portion 60 includes the high compression sandwiching portion 68 where a compression rate of the elastic wall 46 in the axial direction X is set to the highest value at the first sandwiching portion 64 on the outer peripheral side of the sandwiching portion 60, and the compression rate at the high compression sandwiching portion 68 is set higher than a compression rate on the radially inner Ki side of the high compression sandwiching portion 68 and a compression rate on the radially outer Ko side of the high compression sandwiching portion 68.

Here, the compression rate of the elastic wall 46 in the axial direction X is a value which is obtained by dividing a compression amount of the elastic wall 46 in the axial direction X generated by the pair of partition plates 48, 50 by an original thickness of the elastic wall 46, and is defined by $(T-U)/T$ where U is a distance between the pair of partition plates 48, 50 at a portion which becomes a subject (see FIG. 4) and T is an original thickness of the elastic wall 46 at the portion (see FIG. 3). Further, the compression rate of the high compression sandwiching portion 68 is set to a high level such that even when the estimated maximum displacement of the partition plates 48, 50 in the axial direction X occurs, the high compression sandwiching portion 68 is not separated from the wall surface of the elastic wall 46, that is, the compression remains.

To be more specific, in this embodiment, as shown in FIG. 6, in the second sandwiching portion 66 on the inner peripheral side, the compression rate of the elastic wall 46 in the axial direction X is set to an approximately fixed value. In the first sandwiching portion 64 on the outer peripheral side, the compression rate is gradually increased toward the radially outer Ko side. The compression rate becomes maximum at the above-mentioned high compression sandwiching portion 68. The compression rate is gradually lowered toward the radially outer Ko side from the high compression sandwiching portion 68, and the clearance forming portion 62 for forming the clearance 61 comes finally.

For setting such a compression rate, a cross-sectional shape of the pair of partition plates 48, 50 and the elastic wall 46 are formed as follows respectively. The partition plates 48, 50 are formed into a planar shape perpendicular to the axial direction X so as to have a constant distance U from the second sandwiching portion 66 to the high compression sandwiching portion 68 of the first sandwiching portion 64 in the radial direction K. On an outer peripheral side with respect to the high compression sandwiching portion 68, the partition plates 48, 50 are formed into an inclined surface shape gradually inclined axially outward Xo as it goes radially outward Ko (see FIG. 4 and FIG. 6). On the other hand, with respect to the elastic wall 46, a wall surface 70 which opposedly faces the second sandwiching portion 66 is formed into a planar shape perpendicular to the axial direction X, and a portion on an outer peripheral side from the wall surface 70, that is, a wall surface 72 which opposedly faces the first sandwiching portion 64 and a portion of the partition plate on a radially outer Ko side from the first sandwiching portion 64 (that is, the clearance forming portion 62) is formed into an inclined surface shape so as to be inclined axially outward Xo as it goes radially outward Ko (see FIG. 3 and FIG. 6). Accordingly, the elastic wall 46 is formed such that the outer peripheral portion 46A has a large wall thickness. Both the inclined surfaces of the partition plates 48, 50 on the outer peripheral side from the high compression sandwiching portion 68 and the inclined surface of the wall surface 72 of the elastic wall 46 are formed into a curved shape, and a gradient of the former is set larger than a gradient of the latter. Due to such a constitution, the clearance 61 is gradually widened in the direction toward the radially outer Ko side.

Figure 5:
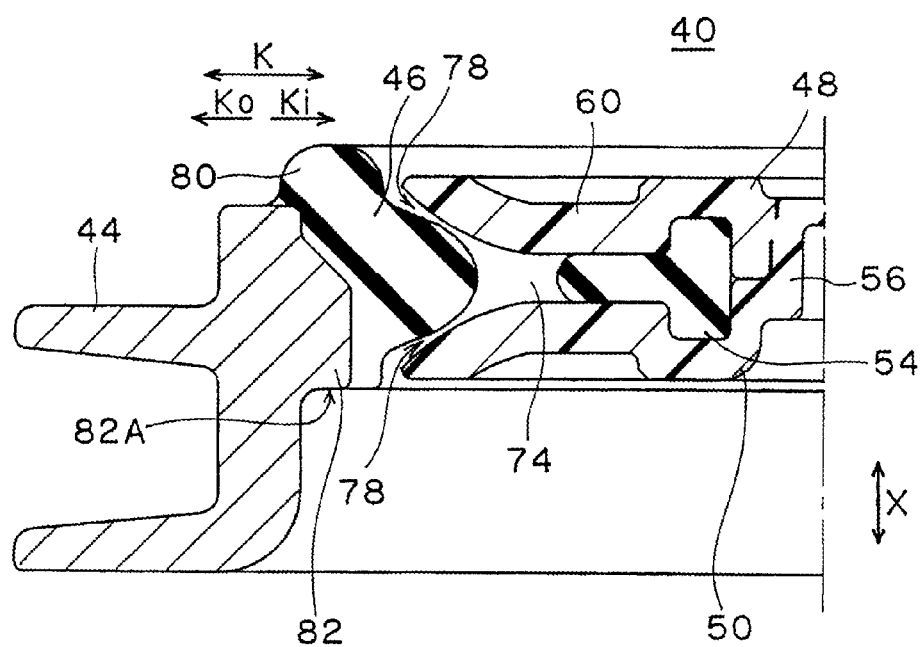
FIG. 5 is a longitudinal cross-sectional view of an essential part showing the structure of the partition element around a through hole in an enlarged manner.
Figure 7:
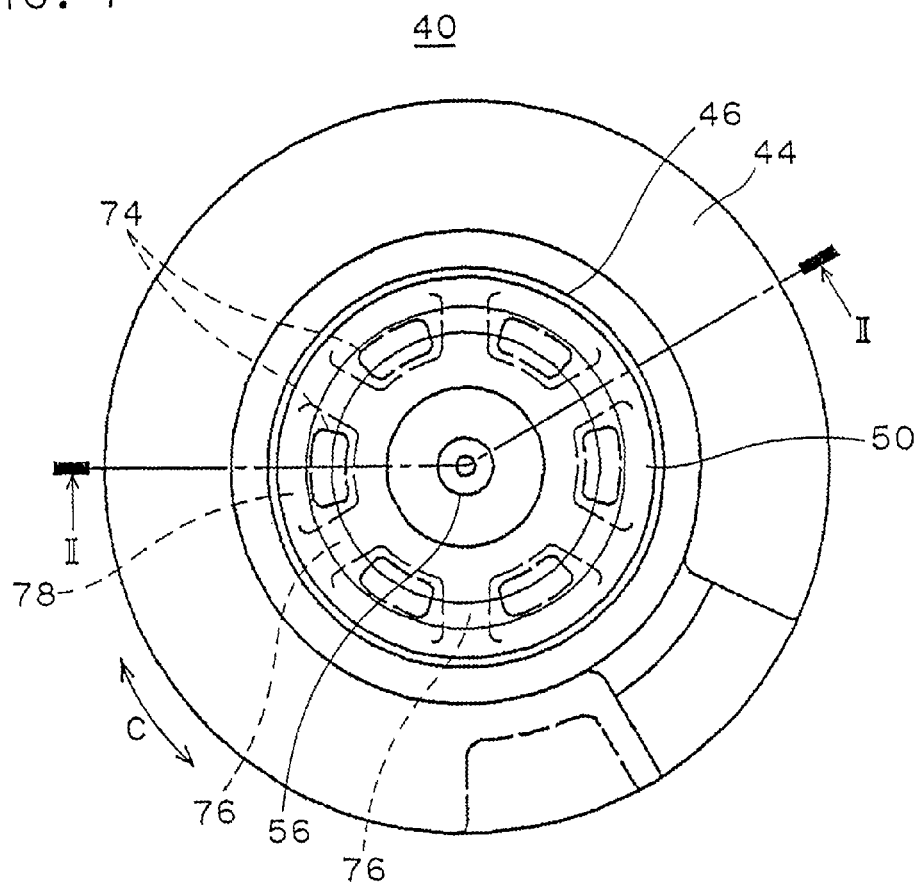
FIG. 7 is a bottom view of the partition element.
Figure 9:
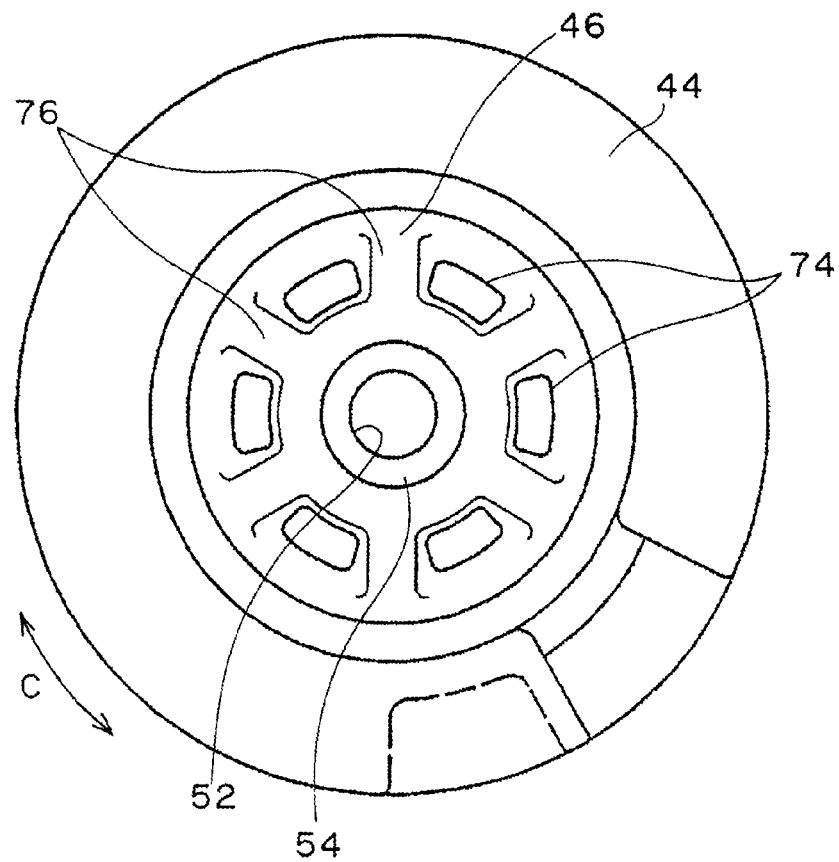
FIG. 9 is a bottom view of an orifice forming member and an elastic wall which constitute the partition element.

As shown in FIG. 3 and FIG. 5, through holes 74 are formed in an elastic wall portion of the elastic wall 46 sandwiched by the pair of partition plates 48, 50 in such a manner that the through holes 74 penetrate the elastic wall portion in the axial direction X. In this embodiment, the through holes 74 are formed in the elastic wall portion which is sandwiched by the above-mentioned high compression sandwiching portions 68. Accordingly, as shown in FIG. 7 and FIG. 9, in the circumferential direction C of the elastic wall 46, the plurality of through holes 74 are alternately formed with clamped portions 76 which are clamped in a compressed state by the high compression sandwiching portions 68 in the axial direction X. To explain in more detail, the through hole 74 is an opening having an approximately quadrangular shape which extends in the circumferential direction C with a predetermined width. Six through holes 74 are formed in the circumferential direction C at equal intervals. Between the respective through holes 74, the clamped portion 76 having an inclined surface shape where a thickness is gradually increased toward the radially outer Ko side is formed radially in such a manner that the clamped portion 76 gently connects the elastic wall portion on the inner peripheral side and the elastic wall portion on the outer peripheral side.

As shown in FIG. 5, on the radially outer Ko side of the through hole 74, gaps 78, 78 which are communicably connected with the through hole 74 are respectively formed between wall surfaces of the elastic wall 46 and respective plate surfaces of peripheral portions of the pair of partition plates 48, 50 which face the wall surfaces in an opposed manner. The gap 78 is arranged above and below each through hole 74 respectively.

The gap 78 is provided for connecting the through hole 74 with the first liquid chamber 36A or the second liquid chamber 36B, and the gap is formed by securing a predetermined distance by preventing the elastic wall 46 and the partition plates 48, 50 from coming into contact with each other at a neutral position of the partition plates 48, 50 on the radially outer Ko side of the through hole 74. Here, the neutral position means a position where there is no liquid pressure difference between the first liquid chamber 36A and the second liquid chamber 36B, that is, a position where the pair of partition plates 48, 50 is not displaced in the axial direction X.

By forming the through holes 74 and the gaps 78 as described above, when the pair of partition plates 48, 50 is at a neutral position, the first liquid chamber 36A and the second liquid chamber 36B are connected with each other by way of the through holes 74 and the gaps 78 in a state where a liquid is allowed to flow between the liquid chambers. Further, the through holes 74 are configured such that when the pair of partition plates 48, 50 are displaced in the axial direction X at the time of large amplitude vibrations, the partition plates 48, 50 are brought into pressure contact with the wall surfaces of the elastic wall 46 so that the gaps 78 are eliminated whereby the through holes 74 are blocked by the partition plates 48, 50.

Symbol 80 indicates a raised portion formed on the outer peripheral portion 46A of the elastic wall 46 (see FIG. 6), and on a first liquid chamber 36A side of the elastic wall 46, the raised portion 80 is formed by raising on an axially outer Xo side with respect to the wall surface 72 having an inclined surface shape, that is, toward the first liquid chamber 36A side. The raised portion 80 is formed such that the raised portion 80 projects toward the axially outer Xo side from an upper surface of the partition plate 48 on the first liquid chamber 36A side.

Further, symbol 82 indicates a projecting portion which is formed on the inner peripheral surface 44A of the orifice forming member 44, and the projecting portion 82 is formed in a projecting manner toward a radially inner Ki side at a root portion of the elastic wall 46 on a second liquid chamber 36B side. A side surface 82A of the projecting portion 82 on the second liquid chamber 36B side is formed into a planar shape perpendicular to the axial direction X of the elastic wall 46, and the side surface 82A is used as a surface with which a forming mold is brought into pressure contact at the time of molding the elastic wall 46 (seal surface for preventing the occurrence of burrs).

Due to the provision of the raised portion 80 and the projecting portion 82, the rigidity of the root portion of the elastic wall 46 with respect to the orifice forming member 44 can be increased so that an effect of restricting the displacement of the pair of partition plates 48, 50 at the time of low-frequency large amplitude vibrations can be enhanced.

According to the liquid-sealed antivibration device 10 of this embodiment having the above-mentioned constitution, when minute amplitude vibrations in a high frequency range are generated, the pair of partition plates 48, 50 reciprocates integrally and hence, a liquid pressure in the first liquid chamber 36A can be absorbed whereby the vibrations can be reduced. Accordingly, a dynamic spring constant can be effectively reduced with respect to high-frequency minute amplitude vibrations. On the other hand, when large amplitude vibrations in a low frequency range are generated, the displacement of the pair of partition plates 48, 50 is restricted by the elastic wall 46 and hence, a liquid is allowed to flow between the first liquid chamber 36A and the second liquid chamber 36B through the orifice flow passage 42 whereby the vibrations can be dampened due to such a liquid flow effect.

Further, in this embodiment, at the time of minute amplitude vibrations in a high frequency range, the first liquid chamber 36A and the second liquid chamber 36B are connected to each other in a state where a liquid is allowed to flow between the first liquid chamber 36A and the second liquid chamber 36B through the through holes 74 and the gaps 78 and hence, such a portion can be used as a high frequency orifice which is operated in a higher frequency range than the above-mentioned orifice flow passage 42. Accordingly, the liquid-sealed antivibration device can exhibit a dynamic spring constant lowering effect based on a resonance action of a liquid which flows through the through holes 74 and the gaps 78. A characteristic of a high frequency orifice formed of the through holes 74 and the gaps 78 can be tuned by changing the number of through holes 74, an opening area of the through hole 74, a shape and a size of the gap 78 and the like.

On the other hand, at the time of large amplitude vibrations, the partition plates 48, 50 are displaced in the axial direction X so that the through holes 74 are blocked by the partition plates 48, 50 so that the liquid cannot flow whereby an original high dampening performance exerted by the orifice flow passage 42 can be secured. Accordingly, it is possible to improve the noise suppressing performance by lowering a dynamic spring constant at the time of minute amplitude vibrations while maintaining the riding comfort performance by securing the high dampening performance at the time of large amplitude vibrations.

In this embodiment, the gaps 78 are respectively formed between the wall surfaces of the elastic wall 46 and the respective plate surfaces of peripheral portions of the pair of partition plates 48, 50 on the radially outer Ko side of the through hole 74 and hence, the through holes 74 are can be easily blocked at the time of large amplitude vibrations while securing the connection between the through holes 74 and the liquid chambers 36A, 36B.

In this embodiment, the elastic wall 46 includes the clamped portions 76 which are sandwiched between the pair of partition plates 48, 50 in a state where the clamped portions 76 are compressed in the axial direction X, and the through holes 74 are formed in the elastic wall 46 alternately with the clamped portions 76 in the circumferential direction C. Accordingly, while imparting a function of a high frequency orifice to the through holes 74, by maintaining a contact state of the partition plates 48, 50 with the elastic wall 46 at the clamped portions 76 between the through holes 74, it is possible to reduce an abnormal sound attributed to a striking sound between the elastic wall 46 and the partition plates 48, 50.

In this embodiment, further, the pair of partition plates 48, 50 includes the sandwiching portions 60 which sandwich the elastic wall 46 on the radially outer Ko side of the connecting portion 56. With respect to each sandwiching portion 60, on the first sandwiching portion 64 arranged on the radially outer Ko side, the high compression sandwiching portion 68 which sandwiches the elastic wall 46 in the axial direction X with a higher compression rate than the second sandwiching portion 66 on the radially inner Ki side is formed. Accordingly, the displacement of the partition plates 48, 50 in the axial direction X before the separation of the partition plates 48, 50 from the elastic wall 46 starts can be set large and hence, an abnormal sound caused by the separation of the partition plates 48, 50 from the elastic wall 46 can be reduced.

To explain this point in detail, in general, a pair of partition plates which is connected to each other via a center connecting portion is separated from an elastic wall with respect to the displacement in the axial direction in such a manner that the separation starts from an outer peripheral side. To the contrary, according to this embodiment, for example, when the partition plates 48, 50 are excessively largely displaced upward, although the upper-side partition plate 48 intends to leave from the elastic wall 46 starting from the outer peripheral side of the partition plate 48, due to the provision of the high compression sandwiching portion 68 on the outer peripheral side which constitutes a separation start point, a contact state of the upper-side partition plate 48 with the elastic wall 46 can be maintained at the high compression sandwiching portion 68. Accordingly, the displacement of the partition plates 48, 50 in the axial direction X before the partition plates 48, 50 starts the separation from the elastic wall 46 can be increased. In this embodiment, particularly, even when the estimated maximum displacement of the partition plates 48, 50 in the axial direction X is generated, the compression rate of the high compression sandwiching portion 68 is set to a high level such that the high compression sandwiching portion 68 is not separated from the wall surface of the elastic wall 46 and hence, the separation of the sandwiching portion 60 from the elastic wall 46 can be surely prevented whereby the occurrence of an abnormal sound can be effectively prevented.

Further, the high compression sandwiching portion 68 is formed on the radially outer Ko side in the sandwiching portions 60 of the partition plates 48, 50, and it is not intended that the compression rate is increased over the whole radial direction K. Accordingly, the partition plates 48, 50 can be easily reciprocated in response to high frequency vibrations while suppressing the increase of rigidity of the elastic wall 46 as a whole. Further, at the time of assembling the partition element 40, defective welding at the connecting portion 56 caused by a reaction force of rubber of the elastic wall 46 compressed in the axial direction X can be avoided thus providing excellent assembling property to the partition element 40.

Further, in this embodiment, the through holes 74 are formed in the elastic wall portion sandwiched by the high compression sandwiching portions 68 and hence, the elastic wall 46 is formed such that low rigidity portions caused by the through holes 74 are intermittently formed in the elastic wall portion sandwiched by the high compression sandwiching portions 68 in the circumferential direction C. Accordingly, a dynamic spring constant can be reduced by easing the reciprocating movement of the partition plates 48, 50 in the axial direction X with respect to minute amplitude vibrations in a high frequency range. The high compression sandwiching portion 68 is a part which increases a compression rate in the axial direction X for preventing the separation of the partition plates 48, 50 from the elastic wall 46 even at the time of large displacement of the partition plates 48, 50 in the axial direction X. On the other hand, when the compression rate in the axial direction X is increased, the hardness of the elastic wall 46 is increased correspondingly. Accordingly, by forming the low rigidity portions caused by the through holes 74 on the high compression sandwiching portion 68 intermittently, it is possible to increase the compression rate in the axial direction X in such a manner that the partition plates 48, 50 are not separated from the elastic wall 46 without making the elastic wall portion sandwiched by the first sandwiching portions 64 on the radially outer Ko side hard, rather by maintaining such a portion soft. Further, since the low rigidity portions are formed on the first sandwiching portions 64 on the outer peripheral side, when vibrations in a high frequency range are inputted, the pair of partition plates 48, 50 can be smoothly reciprocated in the axial direction X while suppressing the displacement of the partition plates 48, 50 in the twisting direction which inclines an axis of the partition plates 48, 50 and hence, an effect of reducing a dynamic spring constant in a high frequency range can be further enhanced.

Further, in this embodiment, the outer peripheral portion 46A of the elastic wall 46 is formed with a large wall thickness and hence, the reciprocating displacement of the partition plates 48, 50 can be effectively restricted at the time of large amplitude vibrations in a low frequency range.

The arrangement, number and shape of the through holes 74 formed in the elastic wall 46 are not limited to the examples described in the above-mentioned embodiment, and can be variously changed. Further, the shape and arrangement constitution of the gaps 78 are also not limited to the corresponding shape and arrangement constitution described in the above-mentioned embodiment. Further, the constitution of the partition plates 48, 50 provided with the high compression sandwiching portion 68 is also not limited to the constitution described in the above-mentioned embodiment, and can be changed variously. Further, various modifications can be made without departing from the gist of the invention although these modifications are not enumerated.

Industrial Applicability

The invention is applicable to various antivibration devices for automobiles, including an engine mount of an automobile, which join a vibration body and a support body to each other in an antivibration manner. Further, the invention is also applicable to various vehicles other than the automobile.

The invention claimed is:

1. A liquid-sealed antivibration device comprising:
a first mounting member; a second mounting member having a cylindrical shape; a vibration-isolating base body which connects the first mounting member and the second mounting member and is made of a elastic material; a diaphragm which is mounted on the second mounting member so as to form a liquid sealed chamber between the diaphragm and the vibration-isolating base body and is formed of a elastic film; a partition element which partitions the liquid sealed chamber into a first liquid chamber on a vibration-isolating base body side and a second liquid chamber on a diaphragm side; and an orifice flow passage which allows the first liquid chamber and the second liquid chamber to be communicated with each other, wherein
the partition element comprises:
an annular orifice forming member which is mounted on an inner side of a peripheral wall portion of the second mounting member and forms the orifice flow passage;
an elastic wall which blocks a space formed within an inner peripheral surface of the orifice forming member and is made of a elastic material; and
a pair of partition plates which are connected to each other via a connecting portion which penetrates a radially central portion of the elastic wall, and sandwiches the elastic wall in an axial direction of the elastic wall, wherein
the elastic wall includes a through hole which is formed in an elastic wall portion thereof sandwiched between the pair of partition plates in such a manner that the through hole penetrates the elastic wall portion in the axial direction, gaps which are connected with the through hole are respectively formed between wall surfaces of the elastic wall and plate surfaces of the pair of partition plates which face the surfaces in an opposed manner, the first liquid chamber and the second liquid chamber are connected with each other by way of the through hole and the gaps in a state where a liquid is allowed to flow between the first liquid chamber and the second liquid chamber when the pair of partition plates is at a neutral position, and the through hole is configured to be blocked by the partition plates due to the displacement of the pair of partition plates in the axial direction and
wherein the elastic wall includes clamped portions which are clamped in a compressed state in the axial direction by the pair of partition plates, and a plurality of through holes are formed in the elastic wall in a circumferential direction alternately with the clamped portions.

2. The liquid-sealed antivibration device according to claim 1, wherein the gaps are formed between the wall surfaces of the elastic wall and plate surfaces of peripheral portions of the partition plate on a radially outer side of the through hole.

3. The liquid-sealed antivibration device according to claim 1, wherein the pair of partition plates each includes a pair of sandwiching portions which sandwich the elastic wall on a radially outer side of the connecting portion, the pair of sandwiching portions is constituted of a first sandwiching portion on a radially outer side and a second sandwiching portion on a radially inner side, and the first sandwiching portion includes a high compression sandwiching portion, which sandwiches the elastic wall in the axial direction with a higher compression rate than the second sandwiching portion.

4. The liquid-sealed antivibration device according to claim 3, wherein the through holes and the clamped portions which are sandwiched by the high compression sandwiching portions are alternately arranged in the circumferential direction of the elastic wall.

\* \* \* \* \*